July 13, 1926.　　　　　　　　　　　　　　1,592,155
G. REDFORD
ANIMAL TRAP
Filed Dec. 8, 1925
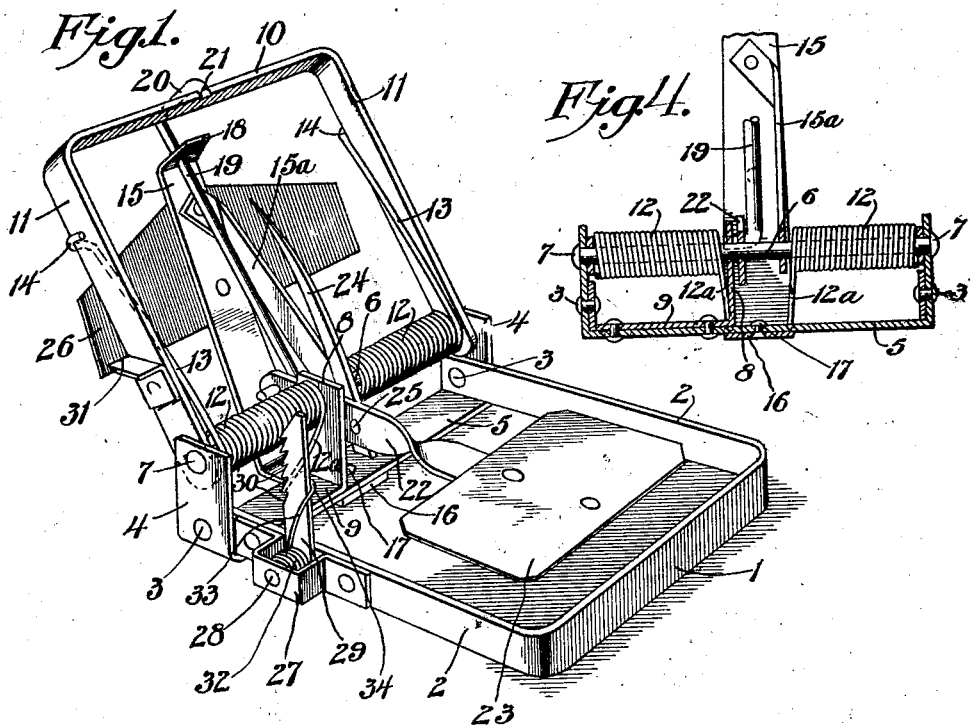
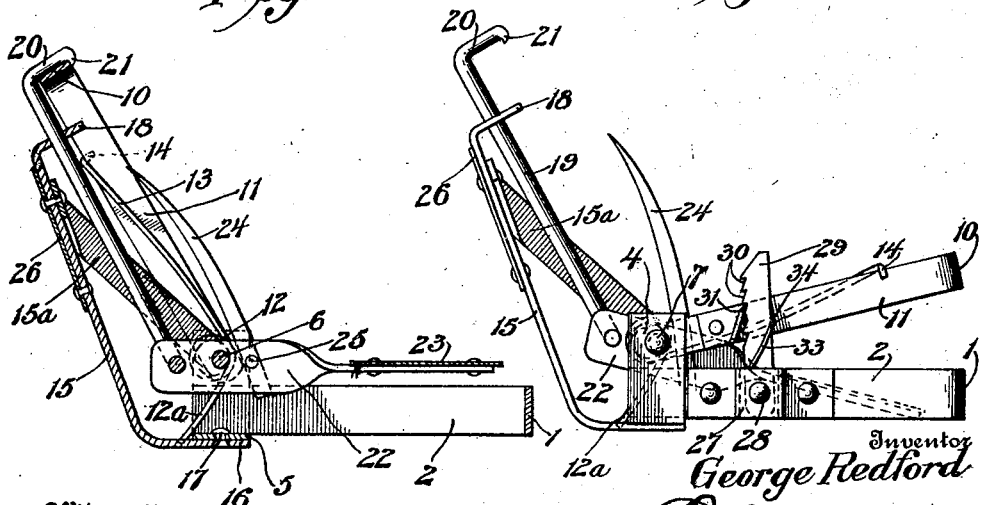
Witnesses
Chas L. McDonald
Howard D. Orr
Inventor
George Redford
By E. G. Siggers
Attorney Patented July 13, 1926.

1,592,155

UNITED STATES PATENT OFFICE.

GEORGE REDFORD, OF COBBLE HILL, BRITISH COLUMBIA, CANADA.

ANIMAL TRAP.

Application filed December 8, 1925. Serial No. 74,014.

This invention relates to animal traps.

The object is to provide a strong and durable trap which may be readily built in various sizes to catch different kinds of rodents or animals and which, being of light construction, may be easily transported from one location to another and either set upon the ground or suspended from a tree or bush with the bait exposed to tempt the animal.

Another object is to provide a trap of this character which when properly set, will promptly act to strike a killing blow upon the neck of the animal without mutilating the skin or fur, and which will effectually hold said animal from escape during the usual struggle preceding death, until removed from the trap by the trapper.

A further object is to provide a trap having a powerfully actuated swinging jaw which may be tripped by certain animals that will bite at the bait and pull on the same, and which may be as readily tripped by other classes of animals that cautiously approach the bait and gently nibble the same, the instantaneous action of the jaw, in the latter case, being accomplished by the weight or partial weight of the animal effecting certain delicate jaw-releasing means incorporated in the structure.

A still further object is to provide a trap of generally open formation which may be easily hidden while on the ground or suspended to allay the fears of the animals, said trap having means for preventing smaller animals or rodents from approaching the bait from the rear thereof and consuming the same in safety.

A final object is to provide a trap having means for locking the swinging jaw in closed position on the neck of the animal so that said jaw may not, by any means, be opened except by the trapper, said locking means being so constructed as to promptly act whether the trap be set in shielded position or in the open and encrusted with snow and ice, etc.

A full and complete understanding of the invention may be obtained from a consideration of the following detailed description, taken in connection with the accompanying drawing forming a part of this specification; it being understood that while the drawing shows a practical form of the invention, the latter is not to be confined to strict conformity with the showing thereof, but may be changed or modified, so long as such changes or modifications mark no material departure from the salient features of the invention, as specifically pointed out in the appended claims.

In the drawing, in which similar reference characters designate corresponding parts throughout the several figures:

Figure 1 is a perspective view of the improved trap, shown in open or set position.

Figure 2 is a side elevation of the same, the swinging jaw being tripped and locked in closed position.

Figure 3 is a longitudinal section thereof, the jaw being open as shown in Figure 1.

Figure 4 is a transverse sectional view showing the mounting of the jaw-actuating springs.

Referring to the drawing there is shown a base member in the form of an open frame composed of suitable strap iron bent to comprise a front bar 1 and opposite, rearwardly-directed side bars 2 joined integrally therewith, the front and sides normally resting upon a support in edgewise position. The rear terminals of the side bars are riveted, or otherwise connected, as at 3, to the upturned ends 4 of a rear cross bar or member 5, also formed of similar strap iron, and adapted to rest flat upon said support beneath the ends of the said side bars, as shown.

Mounted in the upper ends of the upturned terminal portions 4 of the rear cross bar, is a shaft or pintle 6, preferably having its ends riveted in suitable apertures of the portions 4, as shown at 7, and at an intermediate point said pintle is supported by a bearing formed in the upper end of a plate 8, having an angularly bent foot portion 9 which is riveted or otherwise secured to the rear cross bar 5.

By riveting the ends of the pintle rod, the same serves to rigidly brace the upturned ends of the rear cross bar, and said rod acts also as a pivot for a swinging jaw member of substantially the same proportions as the aforesaid base member. Said jaw comprises a front, or upper, cross bar 10 integrally connected to side arms 11, which have their free ends pivoted for swinging action upon said rod 6, in abutting relation to the inner, opposed faces of the upstanding supports. The swinging jaw is formed of the same strap material as the base member or frame, and is adapted to be forcefully swung down into parallelism therewith around the three sides of the same, when the jaw is sprung, in a manner to be described.

For this purpose there are mounted, in surrounding relation to the pintle rod, coiled springs 12 of suitable size and strength, one of said springs being arranged at each side of the intermediate support 8, and each spring has one of its terminals 12ª extending downwardly, adjacent to said support 8, and engaging with the rear edge of the cross bar 5, while the other, or outer terminals 13 of the springs are somewhat extended and provided with outwardly-extending, terminal hooks 14 for engaging over the adjacent edge of the side arms 11 of the swinging jaw. By this manner of mounting the springs, it will be seen that the force of the coiled springs will tend to close the swinging jaw down upon the base frame, when the tripping means is actuated to release the holding means for the open jaw.

A rearwardly and upwardly inclined supporting arm 15 is secured to the rear cross bar 5, by means of a horizontal foot portion 16 extending forwardly and beneath said bar 5 and is riveted thereto, as at 17. The upper end of the supporting arm is bent forwardly and is apertured to form a guide 18, through which a longitudinally-slidable trigger rod 19 is passed, the upper end of the latter being bent forwardly, as at 20, and terminates in a downwardly extending lip 21, for engaging over the front edge of the cross bar 10 of the swinging jaw, as clearly shown in Figure 1 of the drawing.

Mounted for pivotal movement upon the pintle rod 6, and adjacent to one side of the intermediate support 8, is a rocker arm 22, to the rear shorter end of which is pivotally connected the lower end of the aforesaid trigger rod 19, so that when said rocker arm 22 is rocked about the axis of the pintle rod 6, in an upward direction, the aforesaid lip 21 is raised from its engagement with the cross arm 10 and the swinging jaw is allowed to swing down upon the base frame.

The rocker arm 22 is preferably formed of the same material as the base and the jaw, and is mounted on the pintle rod in edgewise position, and the same is given a quarter turn in advance of the support 8 to lie in a flat plane, and is connected at its front, free end to a pedal plate or platform 23, the front edge of which is located in rear of the front bar 1 of the base frame. It will be seen that when an animal steps upon the platform 23, the latter will be deflected, with the result that the lip 21 will release the swinging jaw which instantly swings into contact with the neck of the animal, and the springs are of a force sufficient to deliver a death blow to certain animals.

In order to tempt the animals to step upon the platform, a suitable bait is adapted to be impaled upon an upstanding, rearwardly curved prong 24, suitably secured to the rocker arm 22 in advance of the pintle rod, as indicated at 25, so that, in the event the animal is of a different and a larger size and would not approach the trap close enough to step upon the platform, the mere act of biting or tugging at the bait in an endeavor to free the same from the prong 24, would result in tripping the swinging jaw, as will be readily understood.

In order to prevent some of the smaller animals from approaching the bait from the rear and succeeding in getting hold of the same through the open structure of the swinging jaw, a guard plate 26 is provided which extends outwardly from either side edge of the aforesaid rear inclined, supporting arm 15, to the rear side of which the same is suitably secured, and the said arm 15 is further reinforced by an inclined brace 15ª which has one end connected thereto while the other end has an aperture through which the pintle rod passes.

Secured to the outer face of one of the side bars 2 of the base frame is a relatively small frame 27 formed of strap iron and having a vertical outer wall parallel to the side of the base side bar 2. Mounted transversely of the base is a pintle pin 28 having one end secured in the small frame member 27 and the other in said bar 2, and pivoted on the pintle adjacent to the latter bar is the lower end of a ratchet lever 29 having teeth 30 formed in its rear edge and adjacent to the upper free end of the same. Said teeth are adapted to be engaged by a pawl 31 rigidly attached to the adjacent side arm 11 of the swinging jaw, so that when the latter is swung down, the pawl will ride over the teeth until stopped by the neck or other portion of the entrapped animal, and the said jaw will be effectually locked against upward movement by the struggles of the animal. In order to insure the engagement of the teeth with the said pawl, a coiled spring 32 is mounted on the pintle 28, within the small supplemental frame 27, one terminal of the spring bearing against a portion of the said frame in a well-known manner, while the other terminal is extended upwardly, as at 33, and is provided with a terminal hook 34 which engages aroung the forward edge of the ratchet lever 29 to exert a constant pressure in a rearward direction upon the same.

From the foregoing it will be seen that a simple, cheaply-constructed and strong and durable animal trap has been provided which, by means of the prong 24 and the platform 23 may be effectively tripped by a large or small animal even when the latter does not get hold of the bait; that the trap may be easily hidden by brush, leaves or the like without interfering with the operation thereof; that the bait may not be tampered with from the rear of the trap or devoured without the animal being caught, and finally that the trap may be either suspended from brush or limbs in a vertical position, with the spring end of the frame uppermost and suitably disguised or hidden or placed flat upon the ground and tethered and covered, the method of mounting the ratchet lever 29 serving to prevent clogging of the lever by accumulations of snow or the like, said lever being rocked forwardly with sufficient force by the action of the pawl under the pressure of the springs 12, as to overcome such accumulations.

What is claimed is:

1. An animal trap comprising an open rectangular base frame, a U-shaped swinging jaw having its side arm terminals hinged to the rear of the base frame, springs for forcing the jaw downwardly on the base, a rocking lever mounted on the pintle of the jaw and having a platform at its front end, an upstanding bait prong carried by the lever to rock the same in addition to the platform, an upstanding arm rigidly mounted on the rear end of the base and having a guide eye at its upper end, a trigger rod pivotally connected at its lower end to the end of the rocking lever in rear of the pintle, said rod extending upwardly in an inclined position and adapted to move longitudinally through said guide eye and in rear of the cross bar of the swinging jaw and having a forwardly extending arm terminating in a depending lip for engaging the cross bar to hold the jaw up or open and to be tripped for releasing the same when the prong is pulled forwardly or the platform stepped on.

2. An animal trap comprising an open rectangular base frame, a U-shaped swinging jaw having its side arm terminals hinged to the rear of the base frame, springs for forcing the jaw downwardly on the base, a rocking lever mounted on the pintle of the jaw and having a platform at its front end, a pawl rigidly connected to one of the side arms of the jaw, a supplemental frame connected to the corresponding side of the base frame, a pivotal pin mounted in the supplemental frame, an upstanding ratchet lever pivoted at its lower end on said pin and in position to co-act with the pawl on the jaw when the latter is swung down, and a coiled spring mounted on the pin and engaging the ratchet lever to force the teeth thereof to engage the pawl and lock the jaw in closed position.

3. An animal trap comprising an open rectangular base frame, a U-shaped swinging jaw having its side arm terminals hinged to the rear of the base frame, springs for forcing the jaw downwardly on the base, a rocking lever mounted on the pintle of the jaw and having a platform at its front end, an upstanding bait prong carried by the lever to rock the same in addition to the platform, an upstanding, rearwardly-inclined supporting arm carried by the rear cross bar of the base, a brace arm connected to the latter and to the jaw pintle, a guide formed on the supporting arm, a trigger rod passing through the guide and pivotally connected to the end of the rocking lever where projecting in rear of the hinge pintle, the upper end of said trigger being bent forwardly and terminating in a downwardly-projecting lip for engaging the cross bar of the jaw to hold the same until raised by the rocking lever, and a plate secured to the supporting arm and having side wings to prevent animals from reaching the bait on the prong from the rear.

In testimony that I claim the foregoing as my own, I have hereto affixed my signature.

GEORGE REDFORD.